United States Patent [19]

Bowsky et al.

[11] Patent Number: 4,803,136
[45] Date of Patent: Feb. 7, 1989

[54] METHOD OF MANUFACTURING A SAFETY VENTED CONTAINER AND PRODUCT

[75] Inventors: Benjamin Bowsky, Maineville; Glenn A. Honkomp, Loveland; Larry G. Burrows, Cincinnati; Edward E. Wilson, Milford, all of Ohio

[73] Assignee: Emerson Electric Co., St. Louis, Mo.

[21] Appl. No.: 41,478

[22] Filed: Apr. 23, 1987

Related U.S. Application Data

[63] Continuation-in-part of Ser. No. 782,048, Sep. 30, 1985, abandoned, and a continuation-in-part of Ser. No. 909,302, Sep. 19, 1986, abandoned.

[51] Int. Cl.$^4$ .................. H01M 2/12; C23F 1/00; B44C 1/22
[52] U.S. Cl. .................. 429/56; 156/639; 156/659.1; 156/660; 156/664; 220/207; 220/89 A
[58] Field of Search ............ 156/638, 639, 645, 659.1, 156/660, 664; 429/56, 175, 176; 220/207, 89 A

[56] References Cited

U.S. PATENT DOCUMENTS

| | | | |
|---|---|---|---|
| 2,530,436 | 11/1950 | Maleyre | 156/638 X |
| 3,415,699 | 12/1968 | Brown | 156/660 |
| 3,617,386 | 11/1971 | Bosben et al. | 429/56 |
| 3,723,269 | 3/1973 | Hofling | 156/639 X |
| 3,815,534 | 6/1974 | Kneusel | 220/207 X |
| 4,003,505 | 1/1977 | Hardt | 222/397 |
| 4,122,595 | 10/1978 | Wood et al. | 29/424 |
| 4,175,166 | 11/1979 | Rosansky | 419/56 |
| 4,219,126 | 8/1980 | Oana | 220/89 A |
| 4,245,010 | 1/1981 | Golz | 429/56 |
| 4,256,812 | 3/1981 | Tamara et al. | 429/56 |
| 4,345,611 | 8/1982 | Ikeda et al. | 429/56 |
| 4,416,388 | 11/1983 | Mulawski | 220/207 |
| 4,476,200 | 10/1984 | Markin et al. | 429/56 |

FOREIGN PATENT DOCUMENTS

| | | |
|---|---|---|
| 2336889 | 4/1974 | Fed. Rep. of Germany . |
| 2941749 | 4/1981 | Fed. Rep. of Germany ........ 429/56 |
| 59-79965 | 5/1984 | Japan . |
| 60-12538 | 2/1985 | Japan . |

OTHER PUBLICATIONS

Third International Seminar on Lithium Battery Technology and Applications: Rupture Disk Development and Application, by Baylis C. Navel.

Primary Examiner—David L. Lacey
Assistant Examiner—Andrew J. Anderson
Attorney, Agent, or Firm—Polster, Polster and Lucchesi

[57] ABSTRACT

A method of making a safety vent in an hermetically sealed electro-chemical container device and a novel container portion including such safety vent comprising a unique series of steps including printing a preselected area of the container portion with a masking resist pattern having an uncovered planar area of preselected geometric configuration corresponding to a safety vent area for the container portion and etching the uncovered area to a preselected uniform material thickness to provide a safety vent in the container portion capable of withstanding a preselected pressure before profound and instantaneous rupture.

30 Claims, 4 Drawing Sheets

METHOD OF MANUFACTURING A SAFETY VENTED CONTAINER AND PRODUCT

BACKGROUND OF THE INVENTION

The present invention relates to hermetically sealed electrochemical container devices and, more particularly, to a method of making safety vents in such hermetically sealed containers and novel covers for such containers including safety vents therein. This patent application constitutes a continuation-in-part of patent application Ser. No. 782,048, filed Sept. 30, 1985, now abandoned, and patent application Ser. No. 909,302, filed Sept. 19, 1986, now abandoned, all three of these applications being assigned to a common assignee, Emerson Electric Co., 8000 West Florissant, P. O. Box 4000, St. Louis, Mo. 63136.

It is generally well known to provide an hermetically sealed container with a rupturable safety vent in the container body so that if gas pressures develop within the container beyond a predetermined limit, the vent ruptures to permit release of gas, with the intent of avoiding uncontrollable container disassembly or disintegration and possible damage to surrounding property and personnel. Several such arrangements as taught by the prior art include: a circuit breaking, pressure frangible, hydrogen permeable, flexible—advantageously nylon—diaphragm safety device with a vent weakness area as disclosed in U.S. Pat. No. 3,617,386, issued to Robert J. Bosben, et al, on Nov. 2, 1971, which structure would likely become inoperative with slow leaks; a reduced, punched or pressed area in a container wall designed to rupture in response to predetermined circumferential stresses occurring within the container, as disclosed in U.S. Pat. No. 4,003,505, issued to J. Hardt on Jan. 18, 1977, and U.S. Pat. No. 4,175,166, issued to M. G. Rosansky on Nov. 20, 1979, which structures are contemplated to provide gradual leaking, a condition which Applicant recognizes as undesirable and which Applicant resolves with its inventive arrangement; a sealed container having cruciform shaped, stamped incision of V-shaped cross-section as disclosed in U.S. Pat. No. 4,256,812, issued to K. Tamura, et al, on Mar. 17, 1981, and a cruciform shaped, machined or laser formed grooved area, as disclosed in W. German patent application No. DE2941-749, published Apr. 30, 1981 by Varta Batterie AG, which machine and laser operations are questionably controllable or which leave the material in a recognized undesirable ductile state; blowout areas of uniform and nonuniform reduced thickness for non-hermetic, lead acid batteries, such as disclosed in U.S. Pat. No. 4,245,010, issued to H. Golz on Jan. 13, 1981, the scored, domed container bottom of German Pat. No. 2,336,889, issued Apr. 11, 1974 to Karl Holl Metalwarenfabrik, neither of which describes the specific manner of forming such reduced areas with predoming stressing and varying metal thickness; Japanese patent abstract Vol. 8, No. 190 (E-263) (1627) of Aug. 31, 1984, No. 59-79964(A) to Nihon Denchi K.K. which press works a grooved blow-out area of questionable uniformity; a comparatively complex assembly of several elements which include a thin plate, a plate holding element and superposed cutter such as disclosed in U.S. Pat. No. 4,345,611, issued to Ikeda, et al, on Aug. 24, 1982; a first coined or stamped pressure release tab, prestressed by a second element such as disclosed in U.S. Pat. No 4,416,388, issued to W. J. Mulawski on Nov. 22, 1983, which also would likely become inoperative through small leaks and would limit the rate of escape of undesirable elements and which is predomed to enhance structural strength; and stress formed plastic pressure relief safety membranes limited in size to selected areas, as disclosed in U.S. Pat. No. 4,476,200, issued to C. Markin, et al, on Oct. 9, 1984. Further, the present invention recognizes that the broad use of etching metals to produce patterns on metal surfaces is old, as is taught by expired U.S. Pat. No. 2,530,436, issued to L. R. Maleyre on Nov. 21, 1950 and No. 3,415,699, issued to S. A. Brown on Dec. 10, 1968. And, although it is known in the food arts to use the metal etching of narrow hair lines for tearing to avoid food container stress corrosion and possible concomitant food product damage that otherwise occurs in the manufacture of tear lines by stamping, as is disclosed in U.S. Pat. No. 3,723,269, issued to E. Hofling on Mar. 27, 1957, none of these aforementioned metal etching references recognizes or has been concerned with the pressure build-ups in highly reactive electrochemical container devices. In fact, except for the recognized problem by Hofling in the food container art of stress corrosion leading to food product damage and wherein depth is controlled as opposed to uniformities of remaining metal thickness, and except for more recent attempts to broadly employ etching to make scored rupture discs in pressure vessels as taught by U.S. Pat. No. 4,122,595, issued to Loren E. Wood, et al, on Oct. 31, 1978, which teaches predoming stressing and thus concomitant varying metal thickness of the scored part, and Japanese patent abstract Vol. 9, No. 278 (C-312) (2001) No. 60-125382(A) to Nippon Kokan K.K., which teaches completely removable scored portions to permit the easy opening of food cans, the prior art approach of stamping or coining, milling or routing, or laser removal has continued to be used in producing weakness areas in electro-chemical container devices, as illustrated in the aforedescribed later issued patents to Rosansky, to Nihon Denchi K.K., to K. Tamura, to Varta Batterie AG, to Golz, to Mulawsky and to Markin. In fact, as recently as March, 1987, at the "Third International Seminar on Lithium Battery Technology and Applications," the paper "Rupture Disk Development and Application" by Baylis C. Navel, which extols the concept of reverse buckling of rupture disks with knife blades downstream thereof, states at page 4 of the paper under the heading "Cell Vents," that venting by . . . reforming, stamping, scoring, machining, gouging and chemical milling . . . were considered to be inferior and unacceptable.

In summary, the present invention recognizes that the formation of such safety vents in the past as disclosed in the art above discussed has generally been accomplished on metal containers for the most part by mechanical means such as stamping, pressing or coining which causes non-uniform displacement of the metal or by milling, routing or laser which results in non-uniform removal of metal within restricted limits because of the nature of the operation. Such past forming means have resulted in residual stresses, stress corrosion, non-uniformity in metal thickness and deformed metal grain structure which, in turn, have resulted in non-uniform pressure sensitivity and pressure responsivity characteristics.

In coining, pressing or stamping a safety vent weakness area in metal from the original material to the finished product in a single step or in several steps with intermediate annealing step(s), not only is there a change in the residual stresses causing an increase of susceptibility to stress corrosion, but, in addition, the metal itself work hardens and becomes brittle, resulting in uncontrollable metal fracture. To relieve this symptom, the aforementioned annealing step or steps of the metal is required with consequent increased metal ductility. This increased metal ductility encourages "doming" of the metal surrounding the weakness area and concomitant bending and thickness variations of the weakness area resulting in undesirable small or minor breaks during container pressure build-up. Such minor breaks not only fail to relieve existing pressure in containers to be vented, but in some instances these breaks serve to permit pressure build-up to a point where uncontrollable and undesirably damaging explosions of the container to be vented occur, such as in a lithium battery, where slow venting can allow battery temperature to increase to the melting point of lithium which in the presence of electrolyte can result in violent explosions. Moreover, coining or stamping permits limited thickness control with weakness areas being non-uniform in and of themselves and being non-uniform from container to container. In machine milling or routing weakness areas in metal, it is not practically possible to obtain uniform vents of desired thinness, since the machine milling or routing disturbs the surface area leading to residual stresses, grain changes and potential for surface corrosion in the weakness area with the limited control of the cutting or metal removing tool burnishing the metal as it travels over the surface. As to removal of metal by laser, there is insufficient control with laser beams to attain partial material removal to a desired uniform metal thinness, the generated heat by laser creating undesirable changes in grain structure and metal hardness which could permit the undesirable metal "doming" aforedescribed.

Although the existing art as aforenoted recognizes the use of etching to form scored lines for easy to open caps for food cans and to score safety vents in pre-domed and subsequently domed surfaces of pressure vessels with the scores being of varying weakness, nothing in the prior art even remotely recognizes or suggests the desirability and importance of maintaining uniformity in pressure sensitivity to obtain profound, thorough and instantaneous rupture responsivity of safety vents in sealed electro-chemical container devices without first having minor breaks or fractures which allow dangerous uncontrolled secondary pressure build-ups within the container enhanced by the minor breaks or hair-line fractures. The present invention then provides a new, straightforward, economical and novel method and a unique product which affords such controlled pressure sensitivity and responsivity in a manner previously unknown in the art of manufacturing highly reactive electro-chemical container devices, providing a safety vent with uniform remaining metal thickness and a surface area sufficient to allow for profound, thorough and instantaneous rupture and complete pressure relief at a preselected pressure level without undesirably dangerous preceding minor breaks or leaks which would otherwise permit possibly dangerous and explosive pressure build-ups beyond a desired pressure level, the ruptured metal of the safety vent of the present invention remaining safely attached to a portion of the container of which the safety vent is a part.

The present invention further recognizes not only the desirability and importance of controlled uniformity in pressure sensitivity to obtain profound and thorough rupture responsivity of safety vents in sealed electro-chemical container devices without initial minor breaks or fractures, but in addition, recognizes the desirability and importance of obtaining refined sensitivity to predetermined lower pressure build-ups without sacrifice of such controlled and profound, thorough and instantaneous response.

Various other features of the present invention will become obvious to one skilled in the art upon reading the disclosure set forth herein.

SUMMARY OF THE INVENTION

More particularly, the present invention provides a method of making a safety vent in a hermetically sealed container portion for an electro-chemical device, the safety vent being capable of withstanding a preselected pressure before profound, thorough and instantaneous rupturing under preselected pressure with metal adjacent the rupture remaining attached to the initial portion of the container, comprising: feeding a container portion having initial stress and grain characteristics into a printing zone; printing the container portion while in the printing zone with a masking resist pattern having an uncovered preselected planar area to correspond to a safety vent area; feeding the masked printed container portion to an etching zone; subjecting the container portion while in the etching zone to a controlled etching process to etch the uncovered preselected planar area to a uniform preselected depth to leave a uniform preselected remaining material thickness throughout the etched planar area with a minimum of change in stress and grain characteristics, the remaining material of the etched, planar area being of uniform thickness and preselected surface area to serve as a safety vent; and, feeding the uniformly etched container portion through a rinsing zone to remove the etching materials. In addition, the present invention provides a container portion for an hermetically sealed container for an electro-chemical device, the container portion having at least one etched planar area therein to provide a safety vent therein, the etched planar area being of a preselected uniform depth with minimal differences in stress and grain characteristics from the remaining material of the container portion and of sufficient preselected surface area to provide a safety vent capable of withstanding a preselected pressure before profoundly, thoroughly and instantaneously rupturing under preselected pressure, throughout the preselected area, the metal adjacent the ruptured safety vent remaining integral with the initial container portion, The present invention also provides a unique further method which includes forming an indentation within the etched planar area to obtain refined pressure sensitivity without sacrifice of uniformity of response of the weakness of the safety vent and also provides a unique container portion which includes this safety vent with a planar area having an indentation therein.

It is to be understood that various changes can be made by one skilled in the art in the several steps of the method and in the several parts of the product disclosed herein without departing from the scope or spirit of the present invention. For example, the etching step, the container cover material, the rupture limits and geometry of the safety vent, all can be changed within the teachings of the invention by one skilled in the art to obtain desired results without departing from the inventive scope or spirit of the disclosure set forth herein.

BRIEF DESCRIPTION OF THE DRAWINGS

Referring to the drawings which disclose one advantageous embodiment of the present invention and several modifications thereof:

FIG. 14 is an enlarged plan view of a portion of a strip of material which has been subjected to the modified inventive process of FIG. 13;

FIG. 15 is a further enlarged cross-sectional view of the material of FIG. 14 taken in a plane passing through line 15—15 of FIG. 14;

FIG. 16 is a perspective view of a further modified inventive cover for a hermetically sealed electro-chemical container device, further disclosing a central aperture therein; and, FIG. 17 is a schematic enlarged diagram of the cross-section of a portion of an electro-chemical container device cover disclosing in broken-line exaggerated form for illustration purposes the "doming" effect of pressures within the electrochemical container device on a safety vent area with the vent material being of a ductile nature, this figure serving to further demonstrate the importance of avoiding material ductility, maintaining uniformity of thickness and stress and maintaining grain integrity in the safety vent area.

Figure 1:
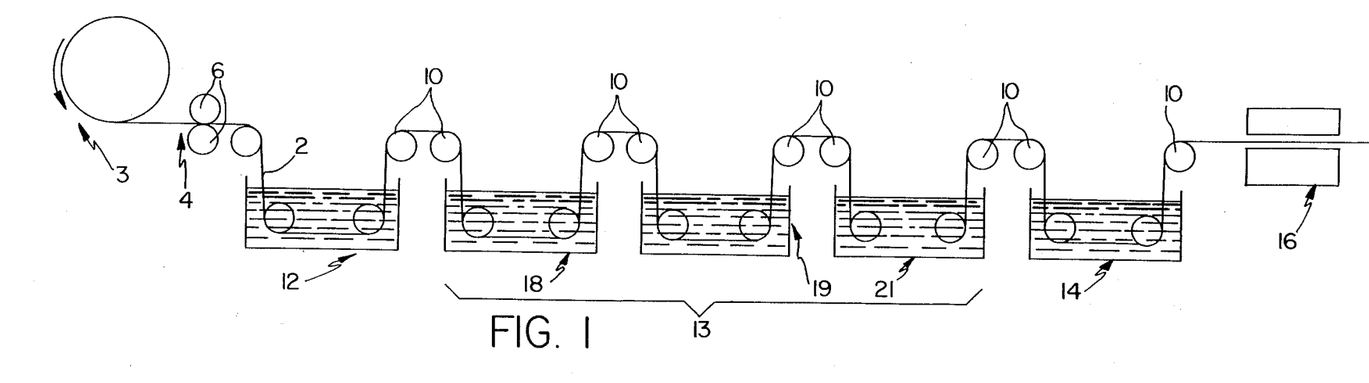
FIG. 1 is a flow diagram setting forth schematically the several steps involved in carrying out one advantageous embodiment of the inventive process.

Referring to FIG. 1 of the drawings, a strip 2 of material is fed from a supply zone 3 where it can be stored in the form of a coil or stacked sheets to a printing zone 4. The strip 2 of stored material can be any one of a number of known materials used in the manufacture of container portions such as covers for hermetically sealed electro-chemical container devices, which is responsive to the hereinafter described controlled etching processes and, in the manufacture of battery containers such as those utilized for hermetically sealed electrochemical batteries of the lithium type, a suitable alloyed steel, for example "304L SS", having a rating of approximately one quarter hardness or greater and a thickness in the range of 0.008 to 0.06 inches and, advantageously, approximately 0.010 inches plus or minus 0.002 inches can be used. It is to be understood that prior to carrying out the etching processes, hereinafter described, an appropriate cleaning and degreasing of the metallic alloy can be accomplished in a satisfactory cleansing and degreasing bath (not shown).

In the event a metallic steel alloy strip is used, as in the examples hereinafter described, a suitable bath using a caustic cleansing agent would suffice.

In printing zone 4, opposed printing rolls 6, frequently or continuously treated with a suitable masking resist agent or etching ground which can be selected from appropriate chemical materials in accordance with the material to be etched and the subsequent chemicals to be used in the etching process, mask all surfaces of the strip of material not to be etched with an appropriate etching resist coating, for example, a synthetic resin capable of resisting the particular etching step to be employed.

Figure 2:
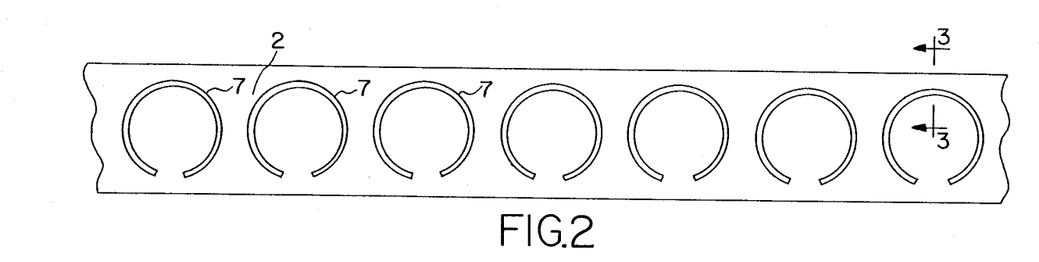
FIG. 2 is an enlarged plan view of a portion of a strip of material which has been subjected to the inventive process of FIG. 1.
Figure 3:
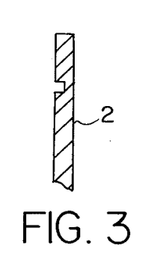
FIG. 3 is a further enlarged cross-sectional view of the material of FIG. 2 taken in a plane passing through line 3—3 of FIG. 2.

The unmasked portion of the strip of material to which no resist coating has been applied in printing zone 4 by rolls 6 can be in any one of several geometric pattern forms in accordance with the present invention. In the embodiment of FIGS. 2 and 3, the geometric pattern includes spaced uncovered preselected planar areas in the form of circular horseshoe-shaped arcs 7 of less than 360°, with a portion of each otherwise complete circle being masked to provide a retention portion. Preferably, a horseshoe-shaped planar area 7 should be sized to extend parallel to the perimeter of the cover with which it is to be associated a distance in excess of half the cover perimeter and, advantageously, a distance of approximately three quarters or 270° of the cover perimeter. In the embodiment of FIGS. 4—12, each of the circular arcs 7 surrounds an uncovered hole defining central area 8 to extend in a generally continuous parallel relationship to the periphery of a cover on at least one surface thereof and in the embodiments of FIGS. 5-8, the arcs 7 are disclosed on opposite surfaces of material strips 2 in opposed mirror image relationship. In FIGS. 9-12, the geometric pattern of unmasked mirror image circular arcs 7 on opposite surfaces of the strip of material 2, each includes an enlarged unmasked chord section 9 located at the base of the arc. it is to be noted that one surface of the strip of material 2 in the FIGS. 9-12 also includes a triangular resist mask area that extends into chord section 9 of each channel 7 so that upon etching each channel 7 on one side incorporates a sharp remaining initial metal piercing point 11 therein. Piercing point 11 is geometrically disposed opposite to the masked covered retention portion of the otherwise circle defining circular arc 7 so as to facilitate tearing and retention of the torn portion when preselected pressure on the etched portion of the cover is exceeded.

Figure 5:
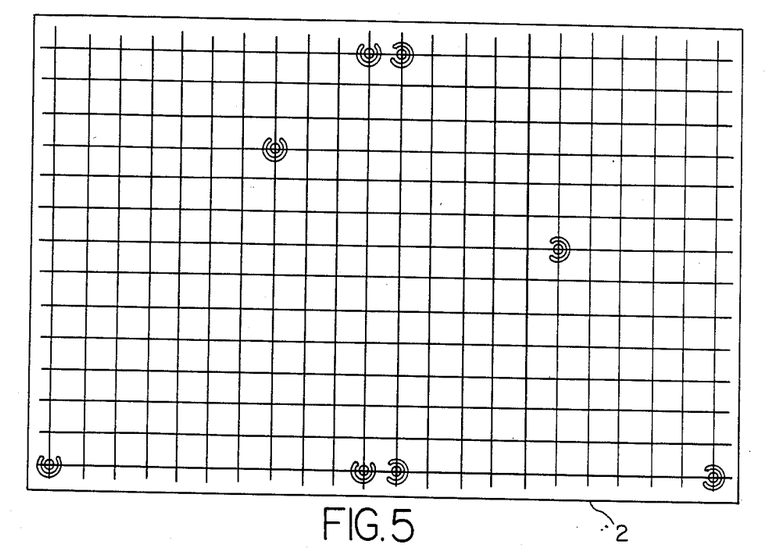
FIG. 5 is a plan view of a sheet of material disclosing two possible positions in which a plurality of modified safety vent areas can be formed on a single sheet of material in accordance with the present invention.
Figure 6:
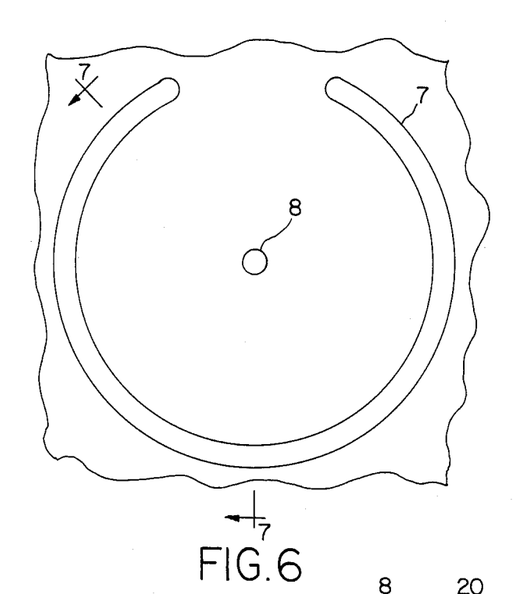
FIG. 6 is an enlarged plan view of a portion of the sheet of material of FIG. 5.
Figure 7:
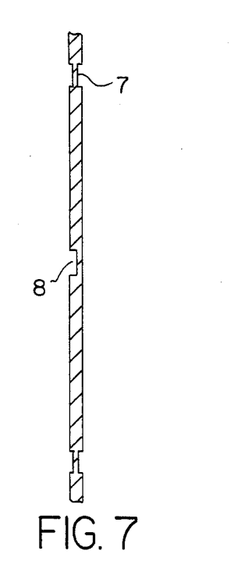
FIG. 7 is a cross-sectional view taken in a plane through line 7—7 of FIG. 6, disclosing a planar safety vent area formed by treating the sheet in mirror image fashion on opposed surfaces thereof.
Figure 8:
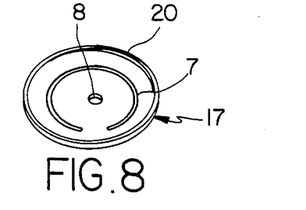
FIG. 8 is a perspective view of one face of a cover for a hermetically sealed electro-chemical container device in accordance with FIGS. 5-7.
Figure 9:
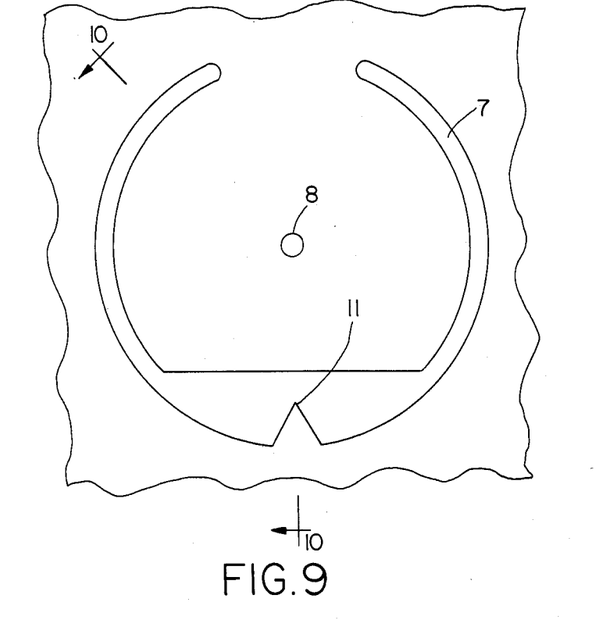
FIG. 9 is an enlarged plan view of a further modified planar safety vent area, disclosing a novel piercing point on one face thereof.
Figure 10:
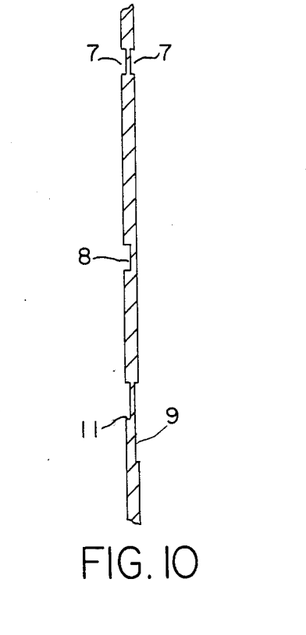
FIG. 10 is a cross-sectional view of the planar safety vent area of FIG. 9 taken in a plane through line 10—10 of FIG. 9.
Figure 11:
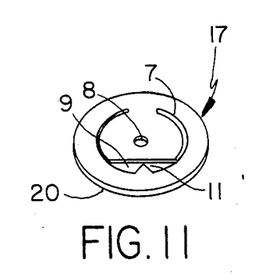
FIG. 11 is a perspective view of one face of a cover for a hermetically sealed electro-chemical container device, in accordance with FIGS. 9 and 10.
Figure 12:
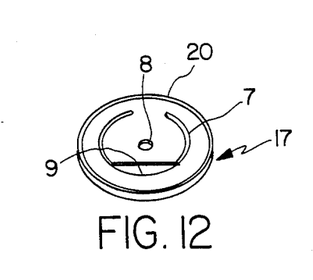
FIG. 12 is a perspective view of the other face of a cover for a hermetically sealed container, in accordance with FIGS. 9 and 10.

Referring to FIG. 5, it can be seen that a plurality of unmasked planar areas 7 can be positioned on strip 2 in any one of a number of different geometric orientations, depending upon stress components, material grains and the results desired. In the embodiment of FIG. 5, each of the horseshoe-shaped planar areas 7 in the lower half of strip 2 is shown as oriented in a position which is at 90° to the horseshoe-shaped areas 7 in the upper half of the strip 2 for purposes of illustration. It is to be understood that other positions can also be utilized and that, generally, all channels on a strip are oriented in a similarly selected position. As also will be noted in FIG. 5, strip 2 can be in the form of individual sheets rather than a continuous coil as disclosed in FIG. 1.

In accordance with the inventive process and again referring to FIG. 1, after strip 2 has been suitably masked with a resist coating in the manner above discussed, strip 2 is fed along spaced idle rollers 10 through an etching zone 12, a rinsing zone 13, a lubricating zone 14 and finally a stamping or forming zone 16 where individual container covers 17, such as disclosed in FIGS. 4, 8, 11 and 12, are formed. It is to be understood that strip 2, after passing through rinsing zone 13, could be again coiled for subsequent treatment elsewhere. It, also, is to be noted that various types of rims 20 can be formed on covers 17 or rims can be eliminated, if so desired.

In passing through zones 12, 13 and 14, strip 2 is fed along suitable idle rollers 10, as above noted. In etching zone 12, strip 2 can be fed through a suitable acid etching bath, such as ferric chloride if the material to be etched is a steel alloy. The density and temperature of the etching bath and even the number of baths can be controlled to avoid gas bubbling. Such parameters as the rate of feed or residence time of the strip within the bath or baths, the acidity concentrations of the bath and bath temperatures are all carefully controlled so that the etching depth and thus the thickness of the material is carefully predetermined and maintained uniform along the unmasked surfaces with a width-to-depth of remaining material ratio advantageously being in excess of six (6). In etching zone 12, maintaining a constant specific gravity of the etching solution is important as is the continuous flow of etching solution. The strip 7 is made sufficiently wide and the flow of etching solution sufficiently vigorous so as to eliminate puddling of the etching solution and to accomplish etching to a uniform depth throughout the unmasked portion of the strip. For example, when a steel alloy of 0.010 inches is used, the etching is controlled to provide a uniform safety vent thickness in the range of 0.001 to 0.006 inches plush or minus 0.0002 inches throughout the uncovered area with a width of 0.040 to 0.300 inches. With this safety vent thickness, the safety vent is capable of profoundly and instantaneously rupturing in the range of approximately 200 to 400 micro-seconds. It is to be understood that advantageously, when battery casing portions, such as covers for hermetically sealed electro-chemical container devices are being processed in accordance with the steps abovedescribed, the depth of etching is so controlled as to leave safety vents of metal thickness capable of withstanding a preselected pressure within the sealed containers of which such covers for a part in the range of approximately 50 to approximately 900 pounds per square inch before the safety vents rupture.

Once strip 2 has been properly etched in etching zone 12, it is then fed through rinsing zone 13. In the inventive embodiments of FIG. 1 and 13, rinsing zone 13 can include three stages, namely, a neutralizing stage 18, a resist stripping stage 19 and a washing stage 21. The neutralizing stage 18 can include a bath of suitable caustic or alkaline solution such as sodium hydroxide. The stripping stage can include an appropriate acidic bath depending upon the chemistry of the mask resist coating applied to printing rolls 6 in printing zone 4 and the washing stage 21 can be a plane tap water bath. From the last stage of rinsing zone 13, strip 2 can be fed to a suitable oil lubricating zone 14 before it is fed into a forming or stamping zone 16 to form covers 17 from strip 2. As in etching zone 12, the residence times and bath concentrations in the rinsing zone 13 and stages 18, 19 and 21 can be controlled in accordance with the results desired.

Figure 4:
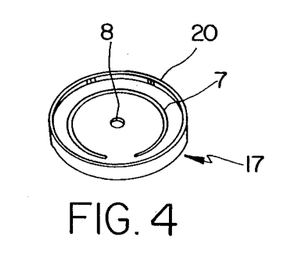
FIG. 4 is a perspective view of an inventive container portion in the form of a cover for a hermetically sealed electrochemical container device, further disclosing central aperture therein.
Figure 13:
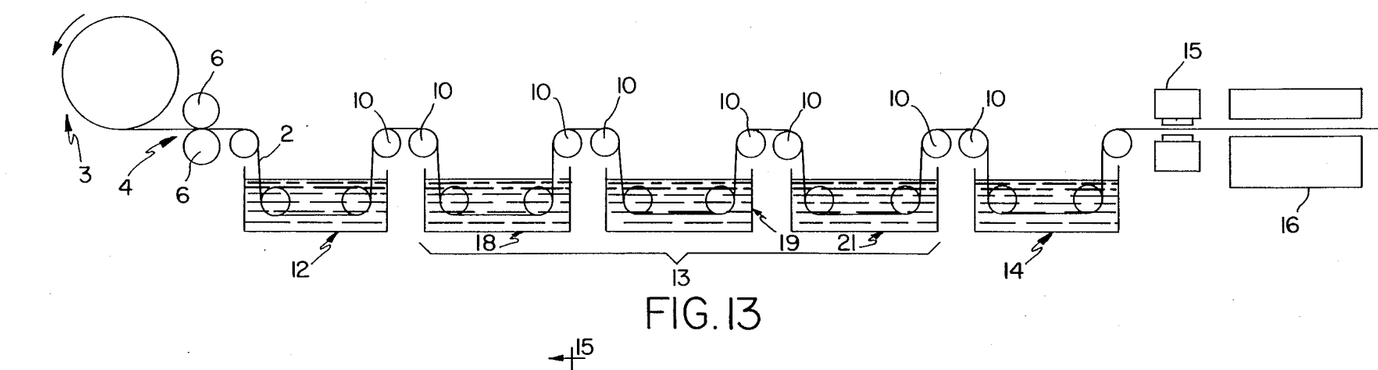
FIG. 13 is a flow diagram setting forth schematically the several steps involved in carrying out a modified form of the inventive process.

In accordance with a further modification of the inventive process and referring to FIG. 13, after strip 2 has been suitably masked wit a resist coating in the manner above discussed, strip 2 is fed along spaced idle rollers 10 through an etching zone 12, to etch the planar safety vent areas 7 thereon of uniform preselected remaining material thickness and breadth capable of withstanding a first preselected mean pressure, a rinsing zone 13, a lubricating zone 14, then into a press forming zone, such as coining zone 15 where indentations 7' are press formed or are formed by working the material into plastic flow within etched areas 7, without significantly disturbing the physical characteristics of planar areas 7, each of the indentations 7' occupying a small portion of the total etched area, for example, approximately 15% thereof, and being of preselected remaining material thickness and breadth capable of withstanding a preselected mean pressure below the mean pressure limitation of planar areas 7. It is to be noted that indentations 7' can be formed in any one of a number of cross-sectional shapes and in FIG. 15, the indentations 7' are shown in "V"-cross-section which can advantageously be of an angle of approximately 90° on one side of strip 2. Once safety vent areas 7 have been properly formed with indentations 7' formed therein in zone 15, strip 2 is fed to a further stamping or forming zone 16 where individual container covers 17, such as disclosed in FIG. 4, are formed. It is to be noted that the width-to-depth ratio of the planar area 7 including the indentation 7' advantageously can be at least six (6). It is to be understood that strip 2, after passing through rinsing zone 13, could be again coiled for subsequent treatment elsewhere. It, also, is to be noted that various types of rims 20 can be formed on covers 17 or rims can be eliminated, if so desired. Further, it is to be understood that the forming of the indentations 7' and covers 17 could be accomplished in the same step.

It is further to be understood that advantageously, when battery or cell covers for hermetically sealed electro-chemical containers are being processed, the depth of etching of said first planar safety vent area is so controlled as abovedescribed to leave a preselected remaining material thickness capable of withstanding a preselected pressure in a range of up to 900 pounds per square inch, plus or minus 100 psi, within the sealed containers of which such covers form a part. Forming the indentations within the planar safety vents is so controlled to leave rupture initiating indentations within the strip-like safety vents capable of uniformly responding to and withstanding a preselected pressure in a range up to 850 pounds per square inch, plus or minus 50 psi, thus refining the control range for profound rupture of the thin safety vent area within approximately 200 to 400 micro-seconds. In a typical example, a steel alloy in the range of approximately 0.008 to 0.06 inches thickness is etched to provide a planar safety vent area of uniform thickness in the range of approximately 0.0025 inches to 0.0035 inches and the formation of the indentation in the planar safety vent area is controlled to provide a uniform remaining material thickness in the safety vent area in the range of approximately 0.0005 to 0.002 inches.

Figures 14, 15, 16, 17:
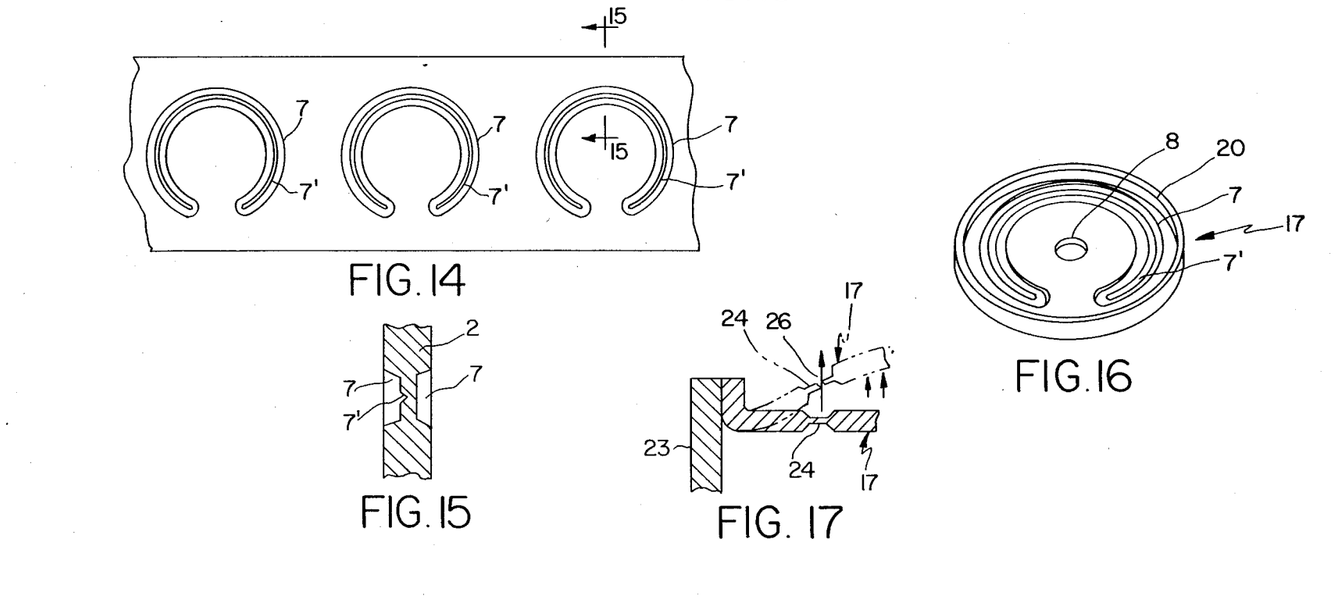

Referring to FIG. 17, there is schematically disclosed in cross-section, a portion of a highly reactive electrochemical container device 23 assembled with a cover 17 having safety vents 24 formed in a ductile material. If pressure in container 23 builds due to unanticipated gas formation caused by electrochemical reaction in the container device 23, cover 17 is displaced or deflected outwardly in dome-like fashion by the pressure. In a lithium battery, for example, if the grain structure of safety vent 24 is frangible or the vent has small or hairline breaks due to stress corrosion and/or non-uniformity of remaining material thickness, minor leaks result in vent 24, as indicated at 26, with heating of electrolyte causing pressure to increase rapidly within container 23 to a dangerous level, leading to the possibilities of massive container explosions with possible concomitant damage to the surrounding environment.

The novel methods and products abovedescribed serve to minimize such undesirable hazards by providing uniformity in safety vent thickness, controlled responsivity to preselected pressure levels, and minimum changes in grain and stress characteristics of the formed membrane. By way of example, reports of Metcut Research Associates Inc. of Cincinnati, Ohio were made at the request of assignee, Emerson Electric Co. These reports serve to substantiate the desirable results accomplished through Applicant's inventive method and product with details of the reports being submitted with this application as Exhibit I.

In summary, one report revealed in a metallographic examination of three sample steel pieces—the first piece being a 304L stainless steel safety vent cap containing a coined impression within a chemically machined pocket, the second piece also being a 304L stainless steel having a "V" shaped coined impression and the third piece being a carbon steel having a coined extension at one end—that coined impression sections were heavily deformed, exhibiting strain lines, with a difference in grain size corresponding to recrystallization, elongated grains and strengthening of the section by work hardening. On the other hand, the microstructure within the chemically treated pocket was the same as the stock or bulk material and was only severely altered around the coined section.

A second report reviewed surface integrity by a literature/data survey—that is, the inherent or enhanced condition of a metal surface produced by various machine operation processes including: conventional milling and surface grinding; electrochemical, electrical discharge and laser machining; and, chemical milling. The report indicated that the chemical milling method can generate good surface characteristics and minimal residual stresses as compared to conventional machining and grinding and other non-traditional processes, such as electrical discharge machining.

As forenoted, it is to be understood that various changes can be made in the several steps of the methods and products disclosed without departing from the scope or spirit of the present invention. For example, other covers of other geometric configurations besides those for cylindrically-shaped hermetically sealed electro-chemical container devices can be so manufactured and other container materials besides steel alloys can be used in the inventive process and the etching treatments and channel geometries can be varied to provide safety membranes which will accommodate other predetermined pressures for containers.

The invention claimed is:

1. A method of making a safety vent in a portion of an hermetically sealed container for an electrochemical device, the safety vent being capable of withstanding a preselected pressure before profoundly rupturing with the metal adjacent the rupture remaining attached to an initial portion of said container portion for effective pressure relief, comprising: feeding said container portion having initial stress and grain characteristics into a printing zone; printing said container portion while in said printing zone with a masking resist pattern having an uncovered preselected planar strip-like area having preselected length and breadth to correspond to a safety vent area; feeding said masked printed container portion to an etching zone; subjecting said container portion while in said etching zone to a controlled etching process using preselected etching materials to etch said uncovered preselected planar area to a uniform preselected depth to leave a uniform preselected remaining material thickness throughout the etched planar area having said preselected length and breadth to be in the form of a flat membrane having stress and grain characteristics substantially like said initial stress and grain characteristics, said remaining materials of said etched planar area formed as said flat membrane being of uniform thickness and preselected surface area to have a controlled and uniform pressure sensitivity of substantially unchanged residual stress to serve as a safety vent and, feeding said uniformly etched container portion through a rinsing zone to remove said etching materials.

2. The method of claim 1, said rinsing zone including a neutralizing stage, a resist stripping stage and a washing stage.

3. The method of claim 1, said printing of said container portion including masking resist patterns with uncovered channel areas in opposed mirror image relation on both faces of said container portion.

4. The method of claim 1, said printing of said container portion including a masking resist pattern having a covered area to provide a piercing point therein.

5. The method of claim 1, said container portion being one of a plurality of covers printed and etched on a continuously moving etchable strip of material fed through said printing zone, etching zone and rinsing zone from a coiled stage in a supply zone.

6. The method of claim 1, said container portion comprising a steel alloy with a rating of at least one quarter hardness in the range of 0.008 to 0.06 inches thickness with the etching of said uncovered strip-like area having said preselected length and breadth to be in the form of a flat membrane being controlled to provide a uniform remaining metal thickness in the range of 0.001 to 0.006 inches with a width of 0.040 to 0.300 inches.

7. The method of claim 1, said container portion comprising a steel alloy of preselected thickness with the etching of said uncovered planar area having said preselected length and breadth to be in the form of a flat membrane being controlled to a width-to-depth of remaining material thickness ratio of at least six (6) to leave a metal thickness capable of withstanding a preselected pressure in the range of approximately 50 to approximately 900 pounds per square inch before profound rupture due to controlled uniform pressure sensitivity within approximately 200 to 400 micro-seconds.

8. The method of claim 1, and feeding said etched container portion from said rinsing zone to a stamping zone to form said etched container portion having said flat membrane into a preselected shape.

9. The method of claim 1, including feeding said etched container portion into a second forming zone to pressure form an indentation area within said planar safety vent area forming said flat membrane, said indentation area being of uniform preselected remaining material thickness capable of withstanding a second preselected mean pressure below the means pressure limitation of said etched planar safety vent area forming said flat membrane.

10. The method of claim 9, wherein said indentation area is press formed into said planar safety vent area forming said flat membrane by a coining step.

11. the method of claim 9, wherein said planar safety vent area forming said flat membrane and said indentation area therein are formed in said container portion to be on the outer side of said container.

12. The method of claim 9, the forming of said planar safety vent area forming said flat membrane including providing mirror image safety vent areas on both faces of said container portion to form said flat membrane.

13. The method of claim 9, wherein said planar safety vent area forming said flat membrane and said indentation area therein are formed in said container portion to be on the inner side of said container.

14. The method of claim 9, said container portion comprising a steel alloy in the range of approximately 0.008 to 0.06 inches thickness with the formation of said planar safety vent area forming said flat membrane being controlled to provide a uniform remaining material thickness in the range of approximately 0.0025 to 0.0035 inches and the formation of said indentation area being controlled to provide a uniform remaining material thickness in said planar safety vent area forming said flat membrane in the range of approximately 0.0005 to 0.002 inches.

15. A method of making safety vents in metallic covers for hermetically sealed battery containers for electro-chemical devices, the safety vents in each cover being capable of withstanding a preselected pressure before profoundly rupturing with the metal adjacent the rupture remaining attached to the cover for effective pressure relief, comprising: feeding a metallic sheet of steel alloy material having initial stress and grain characteristics and preselected thickness from a supply zone through a printing zone; printing said sheet while in said printing zone on the opposite surfaces thereof with a chemical masking resist pattern to provide a masked printed strip which includes spaced uncovered planar areas in the form of horseshoe-shaped circular arcs having preselected length and breadth, each to extend parallel the periphery of a cover for approximately 270°; feeding said masked printed strip to an etching zone; subjecting said strip while in said etching zone to a chemical etching process of constant specific gravity and vigorous flow to etch uncovered planar areas to uniform preselected depths leaving said areas with a uniform remaining metal thickness and preselected surface area throughout the etched area having said preselected length and breadth to be in the form of flat membranes having stress and grain characteristics similar to the initial stress and grain characteristics which serve as safety vents formed as said flat membranes to have a controlled and uniform pressure sensitivity of substantially unchanged residual stress, each flat membrane being capable of withstanding a preselected pressure in the range of approximately 50 to approximately 900 pounds per square inch before profound rupture for effective pressure relief, feeding said etched strip through a rinsing zone which includes a chemical neutralizing stage, a resist stripping stage and a washing stage; and then feeding said rinsed strip to a stamping zone to stamp said etched strip into a plurality of battery covers and to stamp indentations into said etched planar areas forming said flat membranes, each cover including a planar, arc-like flat membrane safety relief vent.

16. The method of claim 15, said chemical masking resist patterns on at least one surface of said strip including spaced uncovered planar areas formed as flat membranes to each include a piercing point therein geometrically opposed to the masked covered portion of said circular arc to facilitate tearing when preselected pressure is exceeded.

17. The method of claim 15, said metallic sheet of steel alloy material comprising a steel alloyin the range of approximately 0.008 to 0.06 inches thickness with the formation of said etched flat membrane areas being controlled to provide a uniform remaining material thickness in the range of approximately 0.0025 to 0.0035 inches and the stamping of said indentations in said etched planar areas forming said flat membranes being in the form of V-shaped grooves of approximately 90° controlled to provide a uniform remaining material thickness in said indented areas of said flat membranes in the range of approximately 0.0005 to 0.002 inches.

18. A container portion for a hermetically sealed container for an electro-chemical device, having at least one planar area chemically etched therein to provide a safety vent of preselected uniform thickness with stress and grain characteristics substantially like the stress and grain characteristics of the remaining material of said container portion in the form of a flat membrane to have a controlled and uniform pressure sensitivity of substantially unchanged residual stress capable of uniformly responding to and withstanding a preselected pressure before profoundly rupturing under preselected pressure with the metal adjacent the ruptured flat membrane safety vent remaining attached to said container portion.

19. The container portion of claim 18, said container portion including opposed mirror image channels etched therein on opposite surfaces of said cover to provide said flat membrane safety vent of uniform thickness.

20. The container portion of claim 18, said container portion being a steel alloy in the range of 0.008 to 0.06 inches thickness with a safety vent uniform thickness in the range of 0.001 to 0.006 inches.

21. The container portion of claim 18, said etching depth being sufficient to provide a safety vent of uniform thickness capable of withstanding a preselected pressure in the range of approximately 50 to approximately 900 pounds per square inch before rupturing.

22. The container portion of claim 18, said container portion being in the form of a container cover with said etched area forming said flat membrane extending in spaced relation from the peripheral edge of said cover less than the entirety of said surrounding edge to leave a retention portion of full cover thickness capable of retaining the remaining material portion of said flat membrane adjacent said etched area when the preselected pressure is exceeded.

23. The container portion of claim 18, said etched planar area forming said flat membrane having a triangular unetched remaining initial material portion extending into said etched planar flat membrane area opposed thereto to provide a piercing point when the preselected pressure is exceeded.

24. The container portion of claim 18, said planar area forming said flat membrane having a width-to-depth of remaining material thickness ratio of at least six (6).

25. The contain portion of claim 18, said planar area forming said flat membrane being chemically etched in said container portion in mirror image relation on both surfaces thereof.

26. The container portion of claim 18, and an indentation formed in said etched planar area forming said flat membrane, said indentation having a preselected remaining material thickness to provide a safety vent capable of uniformly responding to and withstanding a preselected mean pressure lower than the preselected mean pressure of said planar area before rupturing.

27. The container portion of claim 26, said indentation within said planar area forming said flat membrane being press formed therein.

28. The container portion of claim 26, said planar area forming said flat membrane including said indentation having a width-to-depth of remaining material thickness ratio of at least six (6).

29. The container portion of claim 26, said container portion being a steel alloy in the range of approximately 0.008 to 0.06 inches thickness with said etched planar safety vent having a uniform remaining material thickness in the range of approximately 0.0025 to 0.0035 inches and said indentation having a uniform remaining material thickness in the range of approximately 0.0005 to 0.002 inches, capable of rupturing instantaneously within approximately 200 to 400 micro-seconds.

30. A circular steel alloy battery cover for a hermetically sealed container for a lithium electrochemical battery device, said cover having a thickness in the range of 0.008 to 0.06 inches and having opposed chemically etched planar areas therein in the form of horseshoe-shaped arcs of 270° extending parallel to and spaced from the peripheral edge of said cover to provide a safety vent of uniform preselected thickness in the range of 0.001 to 0.006 inches with stress and grain characteristics similar to the stress and grain characteristics of the remaining material in the form of a flat membrane having preselected length and breadth to have a controlled and uniform pressure sensitivity of substantially unchanged residual stress capable of uniformly responding to and withstanding a preselected pressure in the range of approximately 50 to 900 pounds per square inch before profound rupture under preselected pressure with the metal adjacent the safety vent remaining attached to said cover, said arcs surrounding an aperture therein sized to receive an assembly part to be fused therein; and, coin punched indentations of V-shape of approximately 90° in said etched horseshoe-shaped planar arcs forming said flat membrane of said cover of the container to provide a second safety vent within said first safety vent forming said flat membrane having a uniform remaining material thickness of approximately 0.0005 to 0.002 inches capable of uniformly responding to and withstanding a preselect means pressure in a range approximately up to 850 pounds per square inch before rupture

* * * * *